US012335682B2

(12) United States Patent
Liu et al.

(10) Patent No.: US 12,335,682 B2
(45) Date of Patent: Jun. 17, 2025

(54) SOUND DEVICE

(71) Applicant: AAC Microtech (Changzhou) Co., Ltd., Jiangsu (CN)

(72) Inventors: Shasha Liu, Changzhou (CN); Xiaodong Liu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 261 days.

(21) Appl. No.: 18/325,073

(22) Filed: May 29, 2023

(65) Prior Publication Data

US 2024/0223939 A1 Jul. 4, 2024

Related U.S. Application Data

(63) Continuation of application No. PCT/CN2023/072823, filed on Jan. 18, 2023.

(30) Foreign Application Priority Data

Jan. 4, 2023 (CN) ......................... 202320014535.9

(51) Int. Cl.

| | |
|---|---|
| ***H04R 1/28*** | (2006.01) |
| ***H04R 1/02*** | (2006.01) |
| ***H04R 9/06*** | (2006.01) |

(52) U.S. Cl.

CPC ............. *H04R 1/288* (2013.01); *H04R 1/025* (2013.01); *H04R 1/2811* (2013.01); *H04R 1/2826* (2013.01); *H04R 1/2876* (2013.01); *H04R 9/06* (2013.01); *H04R 2201/029* (2013.01); *H04R 2400/11* (2013.01)

(58) Field of Classification Search

CPC .... H04R 1/025; H04R 1/2811; H04R 1/2826; H04R 1/2876; H04R 1/288; H04R 9/06; H04R 2201/029; H04R 2400/11

See application file for complete search history.

(56) References Cited

U.S. PATENT DOCUMENTS

| | | | | |
|---|---|---|---|---|
| 12,035,102 | B2 * | 7/2024 | Niu .......................... | H04R 9/06 |
| 2021/0120343 | A1 * | 4/2021 | Zhang ...................... | H04R 9/02 |
| 2023/0217181 | A1 * | 7/2023 | Yang ...................... | H04R 9/043<br>381/353 |

* cited by examiner

*Primary Examiner* — Huyen D Le

(74) *Attorney, Agent, or Firm* — Wiersch Law Group

(57) ABSTRACT

A sound device includes a sound production unit, a support assembly, a sound absorption material, and a cover plate. The sound production unit includes a vibrating diaphragm, and the vibrating diaphragm is configured to vibrate and sound. The support assembly is fixed to one side, distal from the vibration diaphragm, of the sound production unit. The support assembly and the sound production unit jointly define a sound production rear cavity. The support assembly includes a ventilation structure and a powder filling hole. The ventilation structure is configured to release pressure. The powder filling hole penetrates through the ventilation structure. The sound absorption material is filled into the sound production rear cavity through the powder filling hole. The cover plate covers and is fixed to the powder filling hole. Acoustic performance of the sound device is improved through the sound absorption material.

10 Claims, 10 Drawing Sheets

A-A

B-B

C-C

SOUND DEVICE

TECHNICAL FIELD

The present disclosure relates to a field of electroacoustic conversion, and in particular to a sound device.

BACKGROUND

Sound devices are energy conversion devices for converting electric signals into acoustic signals, and mainly include a sound production unit and an auxiliary structure. The auxiliary structure is configured to improve acoustic performance of the sound production unit. The sound production unit includes a frame, a vibration system, and a magnetic circuit system. The vibration system is fixed to the frame, and the magnetic circuit system is configured to drive the vibration system to vibrate and produce sound.

The sound devices are often applied to devices requiring sounding, such as small mobile terminals including mobile phones, tablets, and video games, or large-scale electronic devices including televisions and notebook computer loudspeakers, which have a wide application range.

Current sound devices only provide performance condition of the sound production unit, so that competitive advantages of the sound devices in the field may only be determined according to the performance of the sound production unit, which only has a small competitive advantage and cannot adapt to current competitive condition.

Therefore, a new sound device is urgently needed to solve above problems.

SUMMARY

A technical problem to be solved by the present disclosure is how to provide a new sound device to solve a problem that current sound devices only provide performance condition of a sound production unit, only having a small competitive advantage and being unable to adapt to current competitive condition.

The present disclosure is implemented by providing a sound device, including a sound production unit, a support assembly, a sound absorption material, and a cover plate.

The sound production unit includes a vibrating diaphragm, and the vibrating diaphragm is configured to vibrate and sound.

The support assembly is fixed to one side, distal from the vibration diaphragm, of the sound production unit. The support assembly and the sound production unit jointly define a sound production rear cavity. The support assembly includes a ventilation structure and a powder filling hole. The ventilation structure is configured to release pressure. The powder filling hole penetrates through the ventilation structure.

The sound absorption material is filled into the sound production rear cavity through the powder filling hole.

The cover plate covers and is fixed to the powder filling hole.

Furthermore, the support assembly is made of metal mesh cloth. The support assembly includes a support flat plate and a support peripheral wall. The support flat plate is disposed at intervals with the sound production unit. The support peripheral wall extends from a periphery of the support flat plate to a periphery of the sound production unit and is fixedly connected to the support flat plate. The sound production rear cavity is formed by jointly enclosing the support flat plate, the support peripheral wall, and the sound production unit. The powder filling hole penetrates through the support flat plate. Mesh holes in the metal mesh cloth are configured to be the ventilation structure.

Furthermore, a concave portion is disposed on the support flat plate. The concave portion is formed by recessing along a direction close to the sound production unit. The powder filling hole is defined in the concave portion.

Furthermore, the support assembly includes a support body, a first through hole, and a first mesh cloth. The support body covers and is fixed to the one side, distal from the vibrating diaphragm, of the sound production unit. The first through hole penetrates through the support body. The first mesh cloth covers and is fixed to the support body. The first mesh cloth completely covers the first through hole. The sound production rear cavity is formed by jointly enclosing the support body, the first mesh cloth, and the sound production unit. The powder filling hole penetrates through the support body. Mesh holes in the first mesh cloth are configured to be the ventilation structure.

Furthermore, the support body is made of metal materials or plastic materials.

Furthermore, the support assembly includes a metal support and a plurality of air holes. The metal support is fixed to the one side, distal from the vibration diaphragm, of the sound production unit. The metal support and the sound production unit jointly form the sound production rear cavity. The plurality of the air holes penetrate through the metal support. The powder filling hole penetrates through the metal support. The plurality of the air holes are configured to be the ventilation structure.

Furthermore, the support assembly includes a support bottom, a support outer side wall, and a second mesh cloth. The support bottom is partially attached and fixed to the one side, distal from the vibrating diaphragm, of the sound production unit. The support outer side wall extends from an outer periphery of the support bottom to a direction distal from the sound production unit. The second mesh cloth covers and is fixed to the support outer side wall. A second through hole penetrates through the support bottom. The sound production rear cavity is formed by jointly enclosing the support bottom, the support outer side wall, the second mesh cloth, and the sound production unit. The powder filling hole penetrates through the support bottom. Mesh holes in the second mesh cloth are configured to be the ventilation structure.

Furthermore, an orthographic projection of the support bottom toward a direction of the sound production unit is at least partially located out of a range of the sound production unit. The powder filling hole is defined in a part, out of the range of the sound production unit, of the support bottom.

Furthermore, the support bottom includes an attachment portion, a bending portion, and an extension portion. The attachment portion is attached and fixed to the one side, distal from the vibrating diaphragm, of the sound production unit. The bending portion is formed by bending and extending from an edge of the attachment portion in the direction distal from the sound production unit. The extension portion is formed by bending and extending from the bending portion in a direction distal from the attachment portion and extends out of the range of the sound production unit. The powder filling hole penetrates through the extension portion.

Furthermore, the support bottom is of an annular structure. The support assembly further includes a support inner side wall. The support inner side wall is formed by recessing from an inner periphery of the support bottom to the direction distal from the sound production unit. An exposed hole is defined in a position of the second mesh cloth corresponding to the support inner side wall. The exposed hole penetrates through the second mesh cloth. The support bottom, the support outer side wall, and the support inner side wall are all of metal structures.

Compared with the related art, according to the sound device of the present disclosure, the support assembly is fixed at the one side, distal from the vibration diaphragm and forms the sound production rear cavity with the sound production unit, the sound absorption material is filled in the sound production rear cavity, so that acoustic performance of the sound device is improved through the sound absorption material. In this way, competitive advantage of the sound device is improved through the improved acoustic performance of the sound device in combination with environment in whole machine application, so that the sound device may adapt to the current competition condition.

BRIEF DESCRIPTION OF DRAWINGS

In order to more clearly illustrate technical solutions in embodiments of the present disclosure or technical solutions in related art, drawings required in description of the embodiments or the related art are briefly described below. Obviously, the drawings in the following description are merely some embodiments of the present disclosure. For a person of ordinary skill in art, other drawings may be obtained according to the drawings without creative efforts.

Figure 1:
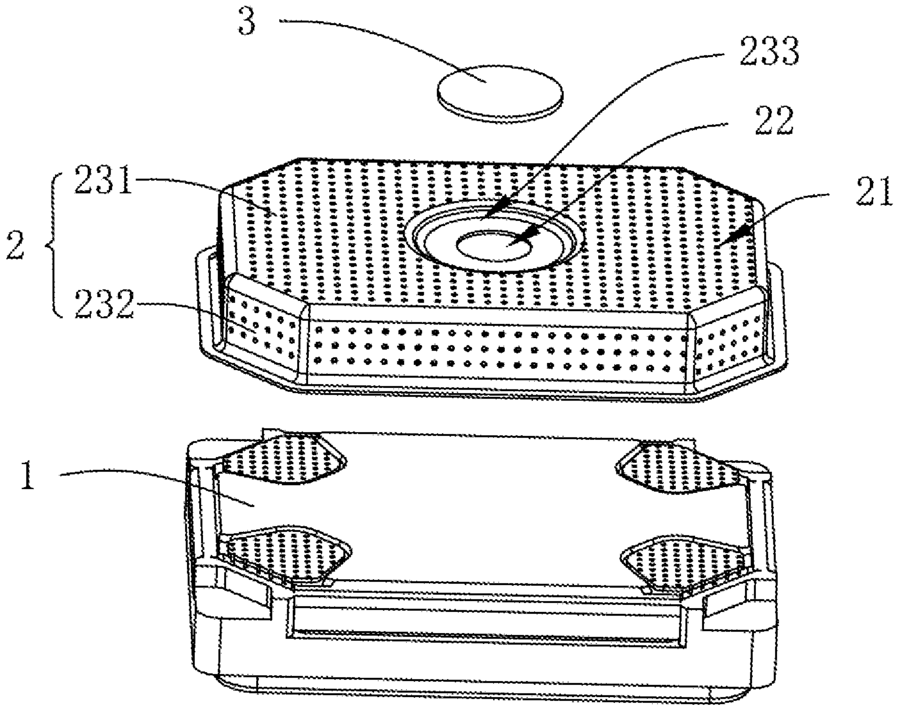
FIG. 1 is an exploded structural schematic diagram of a sound device according to a first embodiment of the present disclosure.

Reference number in the drawings: 100. sound device; 1. sound production unit; 2. support assembly; 21. ventilation structure; 22. powder filling hole; 231. support flat plate; 232. support peripheral wall; 233. concave portion; 241. support body; 242. first through hole; 2421. step; 243. first mesh cloth; 251. support bottom; 2511. second through hole; 2512. attachment portion; 2513. bending portion; 2514. extension portion; 252. support outer side wall; 253. second mesh cloth; 2531. exposed hole; 254. support inner side wall; 3. cover plate; 10. sound production rear cavity.

DETAILED DESCRIPTION

In order to make objectives, technical solutions, and advantages of the present disclosure clearer, the present disclosure is further described in details below with reference to accompanying drawings and embodiments. It should be understood that the specific embodiments described herein are merely configured to explain the present disclosure and are not intended to limit the present disclosure.

Referring to FIGS. 1-10, the present disclosure provides a sound device 100, including a sound production unit 1, a support assembly 2, a sound absorption material, and a cover plate 3, where the sound absorption material is not shown in the figures.

The sound production unit 1 includes a vibrating diaphragm, and the vibrating diaphragm is configured to vibrate and sound, the vibrating diaphragm is not shown in the figures. The support assembly 2 is fixed to one side, distal from the vibration diaphragm, of the sound production unit 1. The support assembly 2 and the sound production unit 1 jointly define a sound production rear cavity 10. The support assembly 2 includes a ventilation structure 21 and a powder filling hole 22. The powder filling hole 22 penetrates through the ventilation structure 21. The sound absorption material is filled into the sound production rear cavity 10 through the powder filling hole 22. The cover plate 3 covers and is fixed to the powder filling hole 22, and the cover plate 3 completely covers the powder filling hole 22.

The sound absorption material is sound absorption particles (zeolite particles) or other materials having sound absorption properties.

Compared with the related art, according to the sound device 100 of the present disclosure, the support assembly 1 is fixed at the one side, distal from the vibration diaphragm and forms the sound production rear cavity 10 with the sound production unit 1, the sound absorption material is filled in the sound production rear cavity 10, so that acoustic performance of the sound device 100 is improved through the sound absorption material. In this way, competitive advantage of the sound device 100 is improved through the improved acoustic performance of the sound device 100 in combination with environment in whole machine application, so that the sound device 100 may adapt to the current competition condition.

In order to better embody various structures of the support assembly 2 in the present disclosure, the followings are four specific embodiments of the present disclosure.

Embodiment 1

Figure 2:
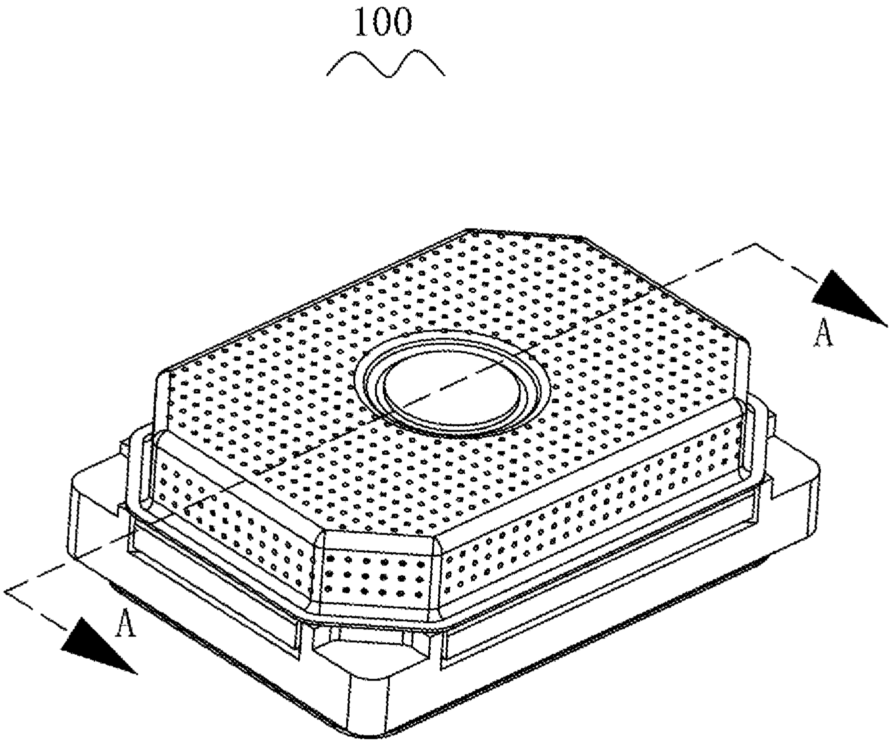
FIG. 2 is a three-dimensional structural schematic diagram of the sound device according to the first embodiment of the present disclosure.
Figure 3:
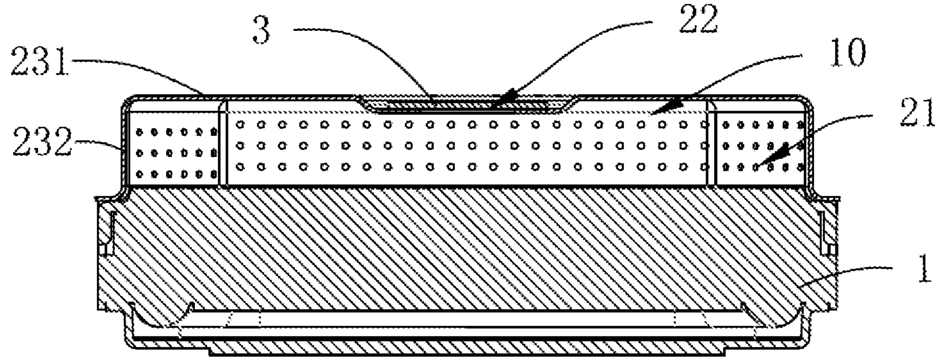
FIG. 3 is a schematic diagram of a cross-sectional view taken along the line A-A shown in FIG. 2.

Referring to FIGS. 1-3, in the embodiment, the support assembly 2 is made of metal mesh cloth. The support assembly 2 includes a support flat plate 231 and a support peripheral wall 232. The support flat plate 231 is disposed at intervals with the sound production unit 1. The support peripheral wall 232 extends from a periphery of the support flat plate 231 to a periphery of the sound production unit 1 and is fixedly connected to the support flat plate 231. The sound production rear cavity 10 is formed by jointly enclosing the support flat plate 231, the support peripheral wall 232, and the sound production unit 1. The powder filling hole 22 penetrates through the support flat plate 231. Mesh holes in the metal mesh cloth are configured to be the ventilation structure 21.

A concave portion 233 is disposed on the support flat plate 231. The concave portion 233 is formed by recessing along a direction close to the sound production unit 1. The powder filling hole 22 is defined in the concave portion 233. By means of such arrangement, one side, distal from the powder filling hole 22, of the cover plate 3 and one side, distal from the sound production unit 1, of the support flat plate 231 are located on a same plane, which reduces height space occupied by the cover plate 3.

In addition, the support assembly 2 is formed by other mesh cloth capable of forming a three-dimensional (3D) structure, that is, the support assembly 2 is made of 3D mesh cloth.

Embodiment 2

Figure 4:
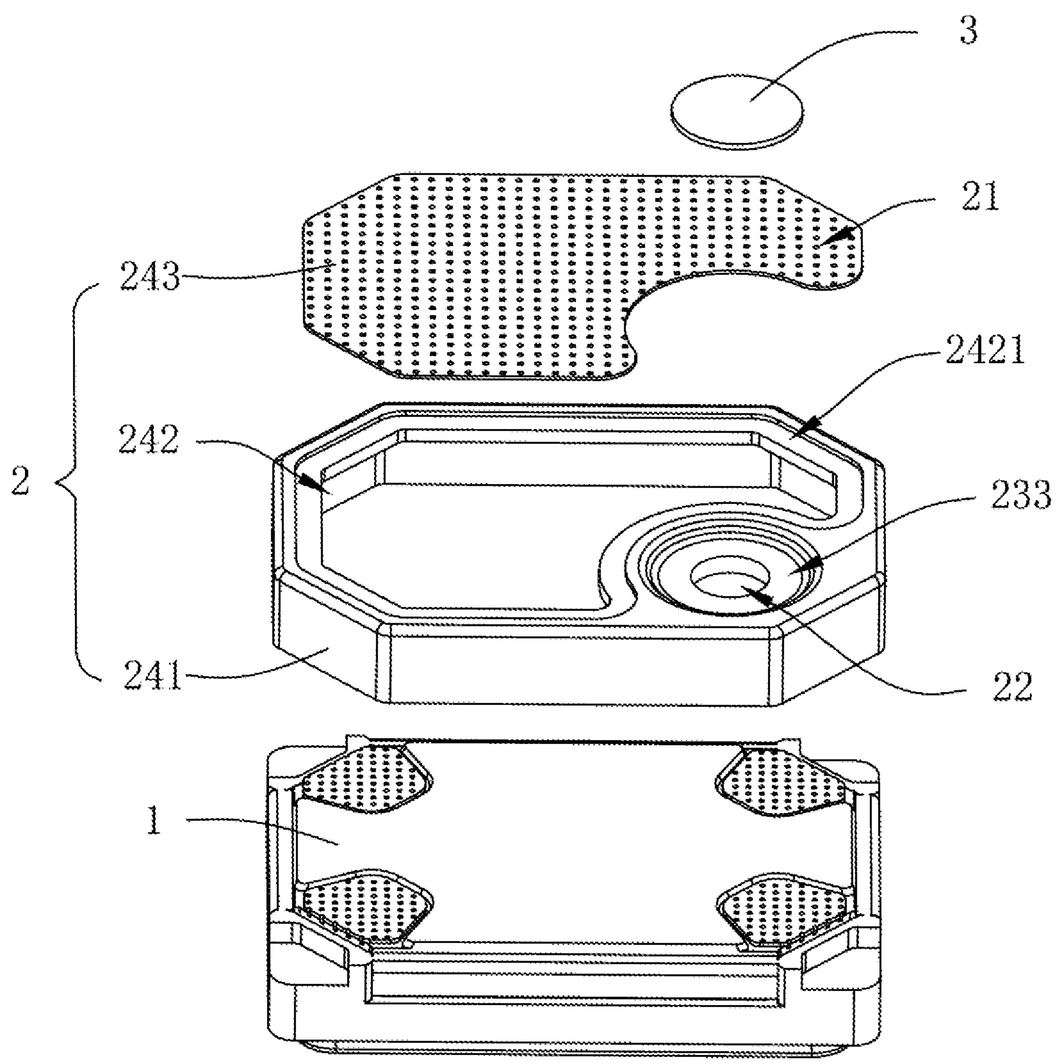
FIG. 4 is a structural decomposition schematic diagram of the sound device according to a second embodiment of the present disclosure.
Figure 5:
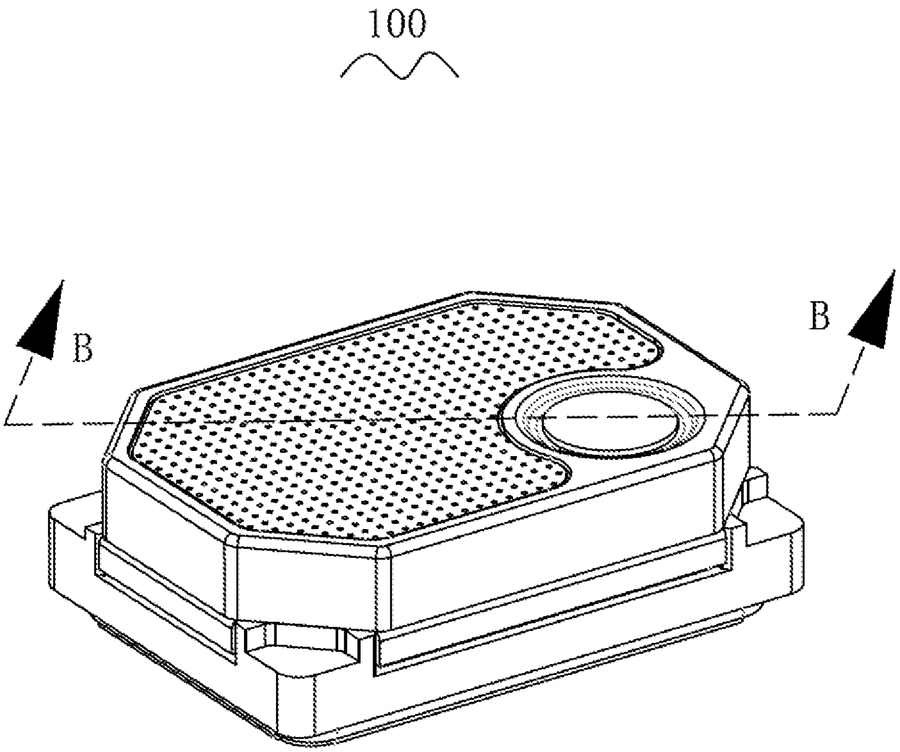
FIG. 5 is a three-dimensional structural schematic diagram of the sound device according to the second embodiment of the present disclosure.
Figure 6:
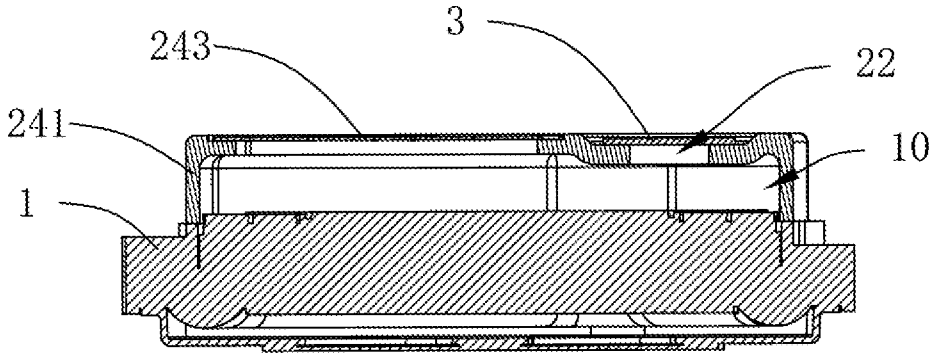
FIG. 6 is a schematic diagram of a cross-sectional view taken along the line B-B shown in FIG. 5.

Referring to FIGS. 4-6, in the embodiment, the support assembly 2 includes a support body 241, a first through hole 242, and a first mesh cloth 243. The support body 241 covers and is fixed to one side, distal from the vibrating diaphragm, of the sound production unit 1. The first through hole 242 penetrates through the support body 241. The first mesh cloth 243 covers and is fixed to the support body 241. The first mesh cloth 243 completely covers the first through hole 242. The sound production rear cavity 10 is formed by jointly enclosing the support body 241, the first mesh cloth 243, and the sound production unit 1. The powder filling hole 22 penetrates through the support body 241. Mesh holes in the first mesh cloth 243 are configured to be the ventilation structure 21.

The support body 241 is made of metal materials or plastic materials.

A step 2421 is disposed on an edge of the support body 241 corresponding to the first through hole 242, and the step 2421 is formed by recessing inward. An edge of the first mesh cloth 243 is fixed to the step 2421, so that one side, distal from the sound production unit 1, of the first mesh cloth 243 and one side, distal from the sound production unit 1, of the support body 241 are located on a same plane, which reduces height space occupied by the first mesh cloth 243.

The support body 241 in the embodiment further includes a support flat plate 231 and a support peripheral wall 232, and the first through hole 242 penetrates through the support flat plate 231.

Embodiment 3

Figure 7:
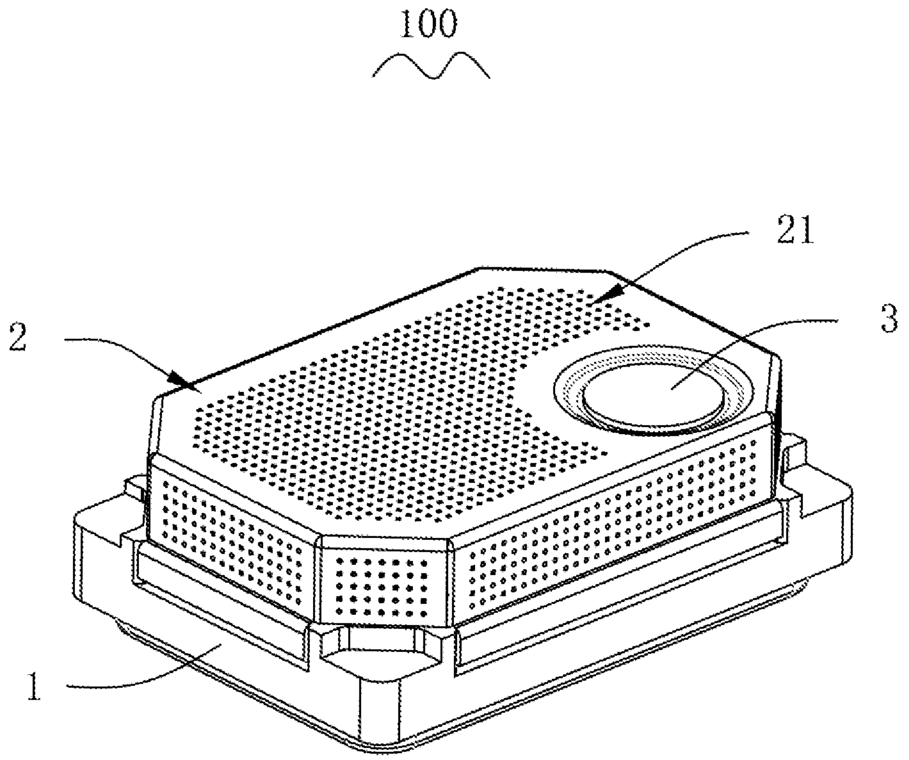
FIG. 7 is a structural decomposition schematic diagram of the sound device according to a third embodiment of the present disclosure.

Referring to FIG. 7, in the embodiment, the support assembly 2 includes a metal support and a plurality of air holes. The metal support is fixed to one side, distal from the vibration diaphragm, of the sound production unit 1. The metal support and the sound production unit 1 jointly form the sound production rear cavity 10. The plurality of the air holes penetrate through the metal support. The powder filling hole 22 penetrates through the metal support. The plurality of the air holes are configured to be the ventilation structure 21.

The support body 241 in the embodiment further includes a support flat plate 231 and a support peripheral wall 232, and the plurality of the air holes penetrate through the support flat plate 231 and/or the support peripheral wall 232. The plurality of the air holes are formed by etching.

Embodiment 4

Figure 8:
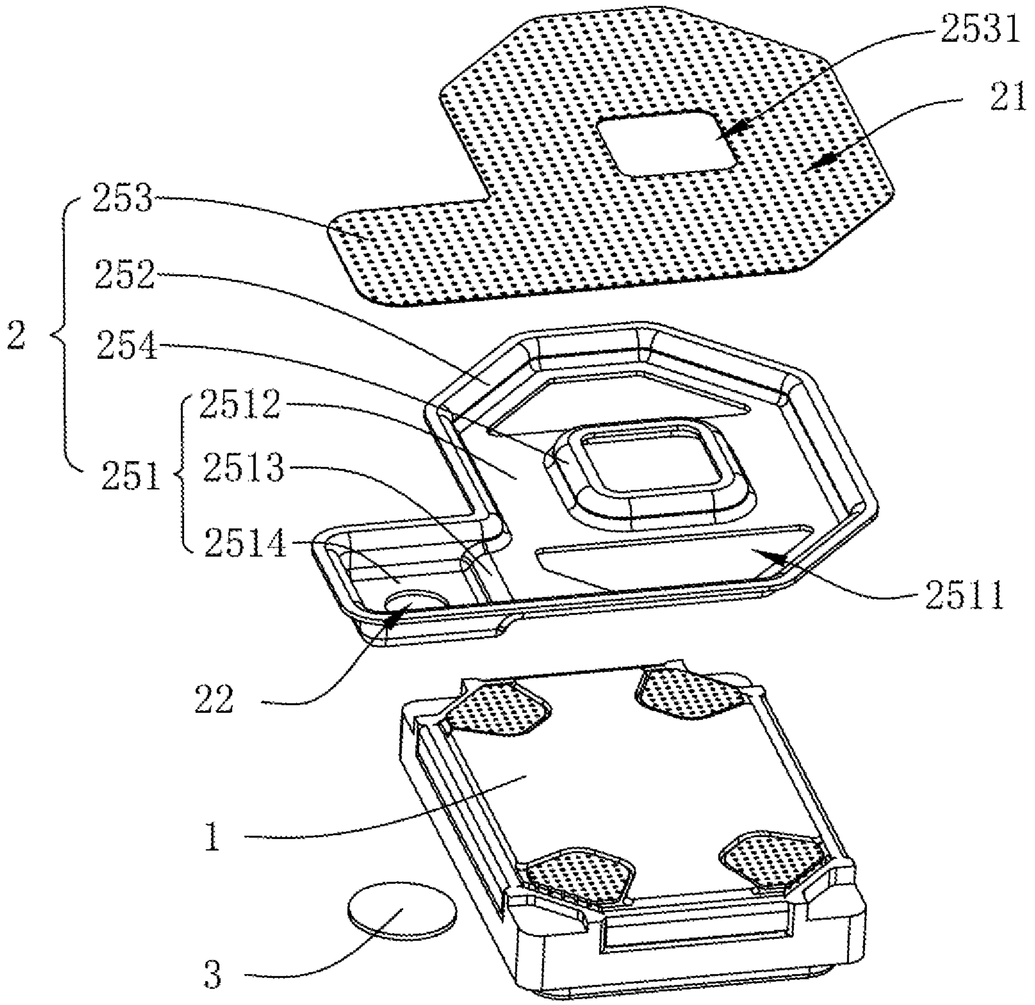
FIG. 8 is a structural decomposition schematic diagram of the sound device according to a fourth embodiment of the present disclosure.
Figure 9:
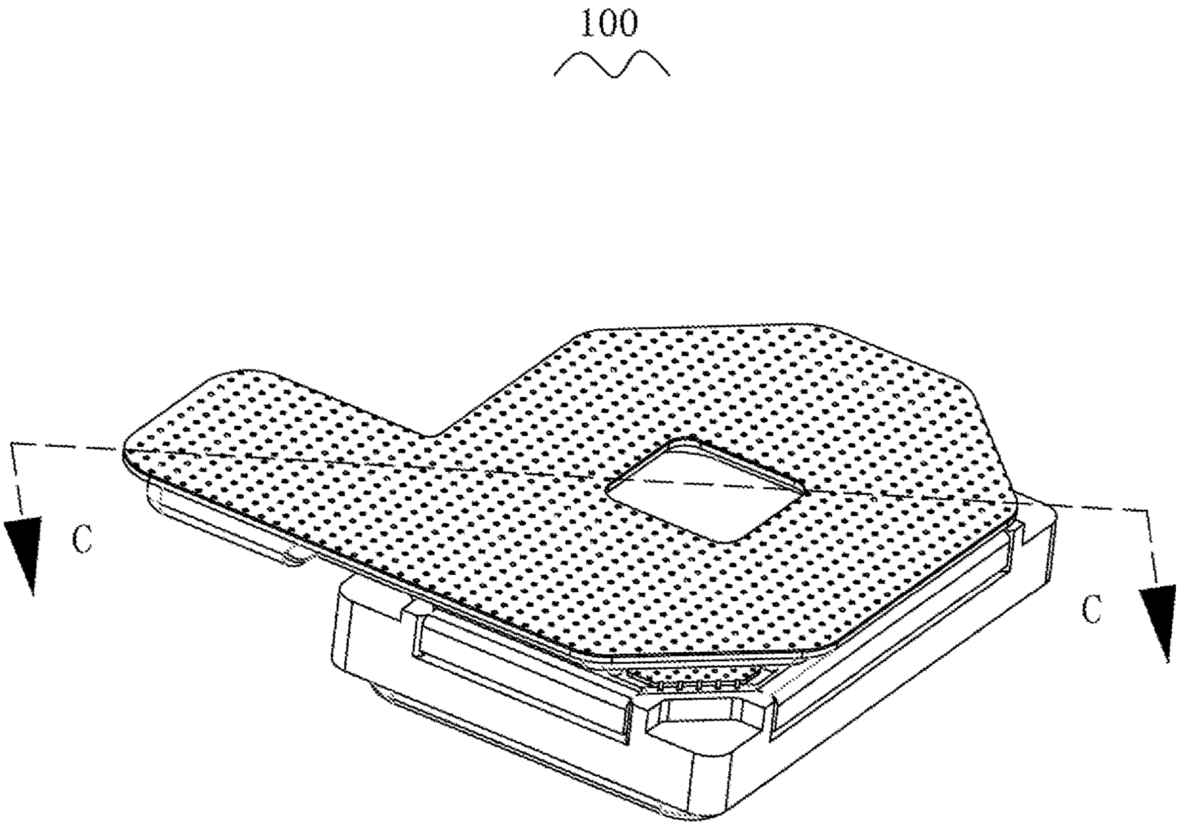
FIG. 9 is a three-dimensional structural schematic diagram of the sound device according to the fourth embodiment of the present disclosure.
Figure 10:
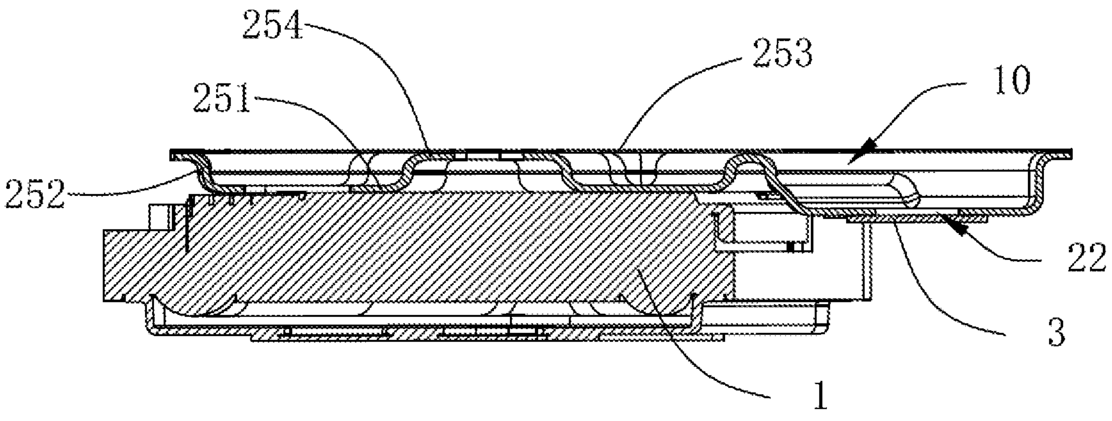
FIG. 10 is a schematic diagram of a cross-sectional view taken along the line C-C shown in FIG. 9.

Referring to FIGS. 8-10, in the embodiment, the support assembly 2 includes a support bottom 251, a support outer side wall 252, and a second mesh cloth 253. The support bottom 251 is partially attached and fixed to one side, distal from the vibrating diaphragm, of the sound production unit 1. The support outer side wall 252 extends from an outer periphery of the support bottom 251 to a direction distal from the sound production unit 1. The second mesh cloth 253 covers and is fixed to the support outer side wall 252. A second through hole 2511 penetrates through the support bottom 251. The sound production rear cavity 10 is formed by jointly enclosing the support bottom 251, the support outer side wall 252, the second mesh cloth 253, and a part of the sound production unit 1 exposed through the second through hole 2511. The powder filling hole 22 penetrates through the support bottom 251. Mesh holes in the second mesh cloth 253 are configured to be the ventilation structure 21.

In the embodiment, an orthographic projection of the support bottom 251 toward a direction of the sound production unit 1 is at least partially located out of a range of the sound production unit 1. The powder filling hole 22 is defined in a part, out of the range of the sound production unit 1, of the support bottom 251.

The support bottom 251 includes an attachment portion 2512, a bending portion 2513, and an extension portion 2514. The attachment portion 2512 is attached and fixed to one side, distal from the vibrating diaphragm, of the sound production unit 1. The bending portion 2513 is formed by bending and extending from an edge of the attachment portion 2512 in a direction distal from the sound production unit 1. The extension portion 2514 is formed by bending and extending from the bending portion 2513 in a direction distal from the attachment portion 2512 and extends out of the range of the sound production unit 1. The powder filling hole 22 penetrates through the extension portion 2514. Correspondingly, the support outer side wall 252 matches with the support bottom 251. That is, the support outer side wall 252 respectively extends from edge positions of the attachment portion 2512, the bending portion 2513, and the extension portion 2514 in a direction distal from the sound production unit 1. In this way, peripheral volume of the sound production rear cavity 10 is increased, which improves the acoustic performance of the sound device 100.

The support bottom 251 is of an annular structure. The support assembly 2 further includes a support inner side wall 254. The support inner side wall 254 is formed by extending from an inner periphery of the support bottom 251 to a direction distal from the sound production unit 1. An exposed hole 2531 is defined in a position of the second mesh cloth 253 corresponding to the support inner side wall 254. The exposed hole 2531 penetrates through the second mesh cloth 253. The second mesh cloth 253 is fixed to a position of the support inner side wall 254 corresponding to an edge position of the exposed hole 2531. Such arrangement supports the second mesh cloth 253 through the support inner side wall 254, avoiding sinking of a middle area of the second mesh cloth 253 without a supporting structure. In addition, the support inner side wall 254 serves as a part of the support bottom 251 that is distal from the sound production unit 1.

At the moment, the sound production rear cavity 10 is jointly formed by the support bottom 251, the support outer side wall 252, the support inner side wall 254, the second mesh cloth 253, and a part of the sound production unit 1 exposed through the second through hole 2511.

The support bottom 251, the support outer side wall 252, and the support inner side wall 254 are all of metal structures.

The above embodiments are only preferred embodiments of the present disclosure, which are not intended to limit the present disclosure. Any modification, equivalent replacement, improvement, etc. made within spirit and principle of the present disclosure should be included within protection scope of the present disclosure.

What is claimed is:

1. A sound device, comprising:

a sound production unit;

a support assembly;

a sound absorption material; and a cover plate;

wherein the sound production unit comprises a vibrating diaphragm, and the vibrating diaphragm is configured to vibrate and sound;

the support assembly is fixed to one side, distal from the vibration diaphragm, of the sound production unit; the support assembly and the sound production unit jointly define a sound production rear cavity, the support assembly comprises a ventilation structure and a powder filling hole, the ventilation structure is configured to release pressure, and the powder filling hole penetrates through the ventilation structure;

the sound absorption material is filled into the sound production rear cavity through the powder filling hole; and the cover plate covers and is fixed to the powder filling hole.

2. The sound device according to claim 1, wherein the support assembly is made of metal mesh cloth, the support assembly comprises a support flat plate and a support peripheral wall, the support flat plate is disposed at intervals with the sound production unit, the support peripheral wall extends from a periphery of the support flat plate to a periphery of the sound production unit and is fixedly connected to the support flat plate, the sound production rear cavity is formed by jointly enclosing the support flat plate, the support peripheral wall, and the sound production unit; the powder filling hole penetrates through the support flat plate, and mesh holes in the metal mesh cloth are configured to be the ventilation structure.

3. The sound device according to claim 2, wherein a concave portion is disposed on the support flat plate, the concave portion is formed by recessing along a direction close to the sound production unit; and the powder filling hole is defined in the concave portion.

4. The sound device according to claim 1, wherein the support assembly comprises a support body, a first through hole, and a first mesh cloth; the support body covers and is fixed to the one side, distal from the vibrating diaphragm, of the sound production unit; the first through hole penetrates through the support body, the first mesh cloth covers and is fixed to the support body, and the first mesh cloth completely covers the first through hole; the sound production rear cavity is formed by jointly enclosing the support body, the first mesh cloth, and the sound production unit; the powder filling hole penetrates through the support body, and mesh holes in the first mesh cloth are configured to be the ventilation structure.

5. The sound device according to claim 4, wherein the support body is made of metal materials or plastic materials.

6. The sound device according to claim 1, wherein the support assembly comprises a metal support and a plurality of air holes, the metal support is fixed to the one side, distal from the vibration diaphragm, of the sound production unit, and the metal support and the sound production unit jointly form the sound production rear cavity, the plurality of the air holes penetrate through the metal support, the powder filling hole penetrates through the metal support, and the plurality of the air holes are configured to be the ventilation structure.

7. The sound device according to claim 1, wherein the support assembly comprises a support bottom, a support outer side wall, and a second mesh cloth; the support bottom is partially attached and fixed to the one side, distal from the vibrating diaphragm, of the sound production unit; the support outer side wall extends from an outer periphery of the support bottom to a direction distal from the sound production unit, the second mesh cloth covers and is fixed to the support outer side wall, a second through hole penetrates through the support bottom, the sound production rear cavity is formed by jointly enclosing the support bottom, the support outer side wall, the second mesh cloth, and the sound production unit; the powder filling hole penetrates through the support bottom, and mesh holes in the second mesh cloth are configured to be the ventilation structure.

8. The sound device according to claim 7, wherein an orthographic projection of the support bottom toward a direction of the sound production unit is at least partially located out of a range of the sound production unit, and the powder filling hole is defined in a part, out of the range of the sound production unit, of the support bottom.

9. The sound device according to claim 8, wherein the support bottom comprises an attachment portion, a bending portion, and an extension portion; the attachment portion is attached and fixed to the one side, distal from the vibrating diaphragm, of the sound production unit; the bending portion is formed by bending and extending from an edge of the attachment portion in the direction distal from the sound production unit, the extension portion is formed by bending and extending from the bending portion in a direction distal from the attachment portion and extends out of the range of the sound production unit, and the powder filling hole penetrates through the extension portion.

10. The sound device according to claim 8, wherein the support bottom is of an annular structure, the support assembly further comprises a support inner side wall, the support inner side wall is formed by recessing from an inner periphery of the support bottom to the direction distal from the sound production unit, an exposed hole is defined in a position of the second mesh cloth corresponding to the support inner side wall, and the exposed hole penetrates through the second mesh cloth; the support bottom, the support outer side wall, and the support inner side wall are all of metal structures.

* * * * *